Nov. 15, 1955     B. G. MARTEN     2,723,482
ROD AND REEL PROTECTOR
Filed May 12, 1952
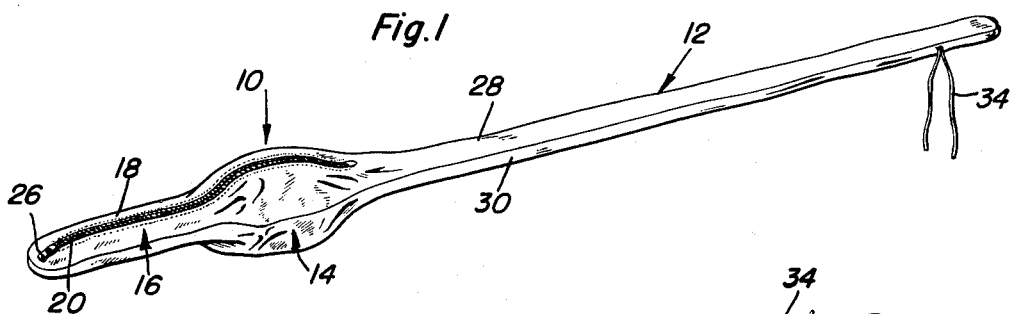
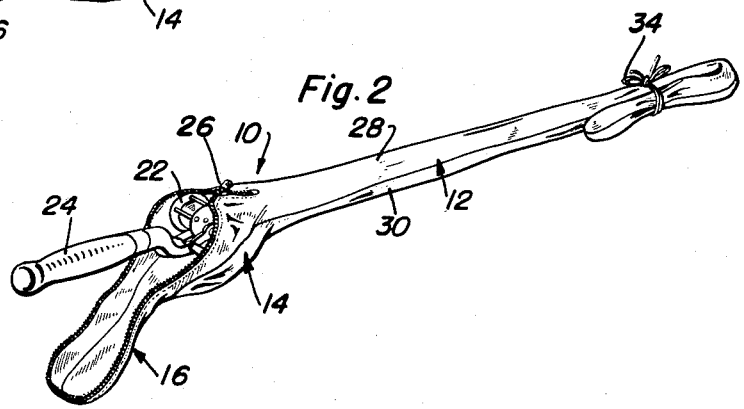
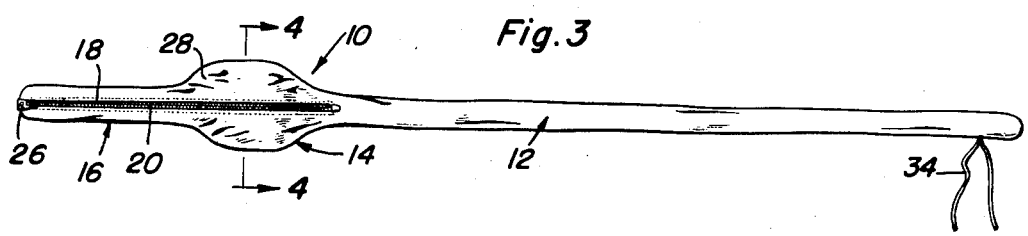
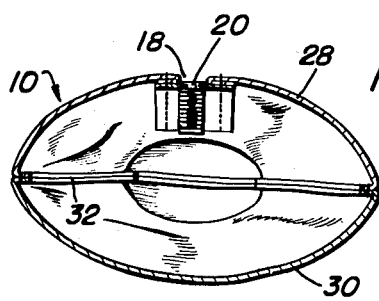
Ben G. Marten
INVENTOR.

United States Patent Office 2,723,482
Patented Nov. 15, 1955

2,723,482
ROD AND REEL PROTECTOR
Ben G. Marten, Manson, Iowa
Application May 12, 1952, Serial No. 287,387
1 Claim. (Cl. 43—26)

This invention relates in general to carrying cases for sporting goods, and more specifically to a protective casing for a rod and attached reel.

The protective carrying cases now on the market for use with fishing equipment are of the type in which a broken down rod is carried in one case and the reel is carried in another case. With these types of cases, it is necessary that the fisherman in order to protect his equipment, remove the reel from its associated rod and normally remove the handle from the rear end of the rod so that the three elements may be properly positioned within one or more cases. Not only is this time consuming, but the reassembling of the elements requires the fisherman to go through the tedium of threading the fishing lines through the line guides of the rod and attaching the weights and hooks or lures thereto.

It is, therefore, desirable to provide a protective carrying case for an assembled fishing rod which is ready for instantaneous use after it has been removed from its associated protective case.

The primary object of this invention is to provide an improved protective carrying case for fishing rods having their reels and fishing line attached, said carrying case being formed in one piece and permitting the quick entrance and removal of the fishing rod therefrom.

Another object of this invention is to provide an improved protective carrying case for a fishing rod having attached thereto a reel and fishing line, said protective carrying case being of a relatively simple construction and formed of inexpensive materials whereby it is economically feasible.

A further object of this invention is to provide an improved protective carrying case for assembled fishing rods, said protective carrying case being formed of a lightweight and flexible material whereby it may be conveniently carried by a fisherman when not in use.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a perspective view of the improved protective carrying case, which is the subject of this invention, a carrying case having disposed therein an assembled fishing rod which extends the full length thereof;

Figure 2 is a perspective view of a protective carrying case similar to that illustrated in Figure 1 and showing the same with the rear end thereof open in order to show the relative position of an assembled fishing rod with respect thereto, the fishing rod being of a shorter length than the protective carrying case and the rod end of the carrying case being doubled over and tied to the adjacent portion thereof and the rod enclosed therein;

Figure 3 is a top plan view of the protective carrying case of Figure 1 and shows the general outline thereof; and Figure 4 is an enlarged transverse vertical sectional view taken substantially on the plane indicated by the section line 4—4 of Figure 3 and shows the general cross section of the protective carrying case, the assembled fishing rod being omitted for purposes of clarity.

Similar characters of reference designate similar or identical elements and portions throughout the specification and throughout the different views of the drawings.

Referring now to the drawings in detail, it is seen that the protective carrying case for assembled fishing rods, which is the subject of this invention, is referred to in general by the reference numeral 10. The protective carrying case 10 includes an elongated tubular portion 12 for receiving the rod portion of a fishing rod and constitutes the forward portion of the protective carrying case 10. The elongated tubular front portion 12 is integral with an enlarged intermediate oval portion 14 and which is adapted to receive the reel of an assembled fishing rod. The protective carrying case 10 also includes a tubular rear portion 16 which is integral with the enlarged intermediate oval portion 14 and disposed at the opposite end thereof from the tubular portion 12. The intermediate portion 14 is enlarged completely around the front and rear portions 12, 16.

It will be understood that the protective carrying case 10 is of a size and configuration to completely encase an assembled fishing rod for which it was designed. In order that the assembled fishing rod may be easily inserted and removed from the protective carrying case 10, the rear and intermediate portions 16 and 14 are provided with a single longitudinally extending opening 18 which is selectively closed by a zipper assembly 20. Referring now to Figure 2 in particular, it will be seen that when the opening 18 is opened, the rod portion of an assembled fishing rod may be conveniently inserted within the elongated tubular portion 12 and a reel 22 associated therewith moved into the intermediate portion 14. At this time, the rear portion 16 is depending below the other portions of the protective carrying case 10 and underlies a handle 24 of the fishing rod. The rear portion 16 is moved up around the handle 24 and the opening 18 is closed by moving a slide element 26 of the zipper 20 rearwardly to the position illustrated in Figure 1.

Referring now to Figure 4 in particular, it will be seen that the protective carrying case 10 is formed in two longitudinally extending halves, an upper half 28 and a lower half 30, which are connected together by a continuous longitudinally extending seam 32. It will be understood that the manner of securing the halves 28 and 30 together to form the seam 32 will vary with the type of material utilized in forming the protective carrying case 10. However, it will be understood that the halves 28 and 30 are preferably formed of flexible materials including canvas, plastics, and leather products. By forming the halves 28 and 30 of flexible materials, the protective carrying case 10 may be readily folded whereby a fisherman may carry it either in his pockets or waistband when it is not being utilized to cover the assembled fishing rod.

Referring now to Figure 1 in particular, it will be seen that carried by the tubular portion 12 adjacent the free end thereof is a tie cord 34. When the protective carrying case 10 is of a proper size for the fishing rod assembly carried therein, the tie cord 34 has no utility. However, when the rod portion of the fishing rod assembly carried within the protective carrying case 10 is of a length much shorter than the length of the elongated tubular portion 12, the free end part of the tubular portion 12 not containing a portion of the rod is doubled over and secured to the adjoining part of the tubular portion 12 and the rod encased therein by the tie cord 34, as is best illustrated in Figure 2.

A fisherman equipped with the protective carrying case 10 may easily and quickly enclose a complete fishing rod assembly, including the reel 22 and fishing line attached thereto, whereby the fisherman may be ready to move from one place to another within a short period of time. When the complete fishing rod assembly is enclosed within the protective carrying case 10, the lines and hooks thereof do not become entangled with other articles or fishing lines and equipment stored adjacent the complete fishing rod assembly, and since the reel and attached fishing line have not been removed from the fishing rod, the complete fishing rod assembly may be quickly put back into action by merely slipping off the protective carrying case 10.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of the invention, as defined in the appended claim.

Having described the invention, what is claimed as new is:

A protective carrying case for enclosing a fishing rod with its reel and handle attached, said protective carrying case comprising an elongated tubular front portion for receiving the rod, a rear tubular portion for receiving the handle of the rod, an an oval intermediate portion enlarged completely around said front and rear portions for enclosing the reel, said rear and intermediate portions being integral and having a single longitudinal opening extending along the same and providing access to the interior of the case for the insertion of the fishing rod, said casing being formed of upper and lower halves connected together by a longitudinal seam, said opening being in said upper half and bisecting said intermediate portion.

References Cited in the file of this patent

UNITED STATES PATENTS

| | | |
|---|---|---|
| 1,620,072 | Chase | Mar. 8, 1927 |
| 2,149,087 | Fisher | Feb. 28, 1939 |
| 2,180,686 | Lorinovich | Nov. 21, 1939 |
| 2,650,449 | Suring | Sept. 1, 1953 |

OTHER REFERENCES

Spring Catalogue of L. L. Bean Inc., Freeport, Me., published 1938, page 3.

Spring Catalogue of L. L. Bean Inc., as cited immediately above, pages 5, 6 and 59.